United States Patent

Oran et al.

(10) Patent No.: US 10,432,509 B2
(45) Date of Patent: Oct. 1, 2019

(54) FLOW CLASSIFICATION FOR INFORMATION CENTRIC NETWORK PROTOCOLS

(71) Applicant: CISCO TECHNOLOGY, INC., San Jose, CA (US)

(72) Inventors: David R. Oran, Cambridge, MA (US); Ilya V. Moiseenko, Somerville, MA (US); Milad Mahdian, Watertown, MA (US); Maziar Mirzazad Barijough, Santa Cruz, CA (US)

(73) Assignee: Cisco Technology, Inc., San Jose, CA (US)

( * ) Notice: Subject to any disclaimer, the term of this patent is extended or adjusted under 35 U.S.C. 154(b) by 376 days.

(21) Appl. No.: 15/182,379

(22) Filed: Jun. 14, 2016

(65) Prior Publication Data

US 2017/0359254 A1   Dec. 14, 2017

(51) Int. Cl.
| | |
|---|---|
| *H04L 12/721* | (2013.01) |
| *H04L 29/06* | (2006.01) |
| *H04L 12/725* | (2013.01) |
| *H04L 29/08* | (2006.01) |
| *H04L 29/12* | (2006.01) |
| *H04L 12/741* | (2013.01) |

(52) U.S. Cl.
CPC ............ *H04L 45/38* (2013.01); *H04L 45/306* (2013.01); *H04L 67/327* (2013.01); *H04L 69/22* (2013.01); *H04L 45/74* (2013.01); *H04L 45/745* (2013.01); *H04L 61/15* (2013.01)

(58) Field of Classification Search
None
See application file for complete search history.

(56) References Cited

U.S. PATENT DOCUMENTS

| 6,754,206 B1 | 6/2004 | Nattkemper et al. |
| 7,133,417 B1 | 11/2006 | Kao et al. |
| 8,160,069 B2 * | 4/2012 | Jacobson ............... H04L 45/00 370/256 |

(Continued)

OTHER PUBLICATIONS

International Search Report and Written Opinion in corresponding International Application No. PCT/US2017/036404, dated Sep. 11, 2017, 11 pages.

(Continued)

*Primary Examiner* — Bob A Phunkulh

(57) ABSTRACT

Embodiments include technologies for identifying an equivalence class identifier in a packet received by a node configured to perform information centric networking (ICN) in an ICN network, where the packet includes a name identifying content associated with a producer node in the ICN network. Embodiments also include determining an equivalence class for the packet by determining a name prefix of the name based, at least in part, on the equivalence class identifier. Embodiments further include taking an action affecting a particular packet, the action based, at least in part, on the equivalence class. In specific embodiments, the name includes a plurality of name components, and the equivalence class identifier is a count indicating a number of name components in the name to be grouped together to determine the name prefix. In further embodiments, the number is greater than a particular number of name components in a routable name prefix.

23 Claims, 11 Drawing Sheets

(56) References Cited

U.S. PATENT DOCUMENTS

| | | | |
|---|---|---|---|
| 9,825,860 B2* | 11/2017 | Azgin | H04L 45/306 |
| 2005/0027870 A1 | 2/2005 | Trebes | |
| 2013/0242996 A1* | 9/2013 | Varvello | H04L 67/327 |
| | | | 370/392 |
| 2015/0350078 A1 | 12/2015 | Azgin et al. | |
| 2015/0373162 A1* | 12/2015 | Mosko | H04L 69/22 |
| | | | 370/392 |
| 2016/0006747 A1* | 1/2016 | Solis | H04L 63/123 |
| | | | 726/26 |
| 2016/0021172 A1* | 1/2016 | Mahadevan | G06F 17/30598 |
| | | | 709/204 |
| 2016/0043940 A1 | 2/2016 | Mahadevan et al. | |
| 2016/0044126 A1* | 2/2016 | Mahadevan | H04L 67/2842 |
| | | | 709/213 |
| 2016/0105524 A1* | 4/2016 | Farhadi | H04L 67/2842 |
| | | | 370/412 |
| 2016/0292274 A1* | 10/2016 | Park | H04L 45/745 |
| 2016/0352614 A1* | 12/2016 | Valencia Lopez | H04L 45/021 |
| 2017/0034055 A1* | 2/2017 | Ravindran | H04W 40/20 |
| 2017/0046342 A1* | 2/2017 | Azgin | H04L 45/7453 |
| 2017/0085441 A1* | 3/2017 | Azgin | H04L 43/028 |
| 2017/0091251 A1* | 3/2017 | Wood | G06F 17/30117 |
| 2017/0093710 A1* | 3/2017 | Garcia-Luna-Aceves | H04L 45/74 |
| 2017/0093713 A1* | 3/2017 | Garcia-Luna-Aceves | H04L 45/50 |
| 2017/0111330 A1* | 4/2017 | Mosko | H04L 9/00 |
| 2017/0126643 A1* | 5/2017 | Wood | H04L 9/0861 |
| 2017/0126850 A1* | 5/2017 | Mosko | H04L 5/0055 |
| 2017/0126851 A1* | 5/2017 | Mosko | H04L 45/74 |
| 2017/0126854 A1* | 5/2017 | Mosko | H04L 69/04 |
| 2017/0149747 A1* | 5/2017 | Wood | H04L 9/0816 |
| 2017/0155738 A1* | 6/2017 | Dong | H04L 67/1097 |
| 2017/0163760 A1* | 6/2017 | Wood | H04L 45/7453 |
| 2017/0201577 A1* | 7/2017 | Wood | H04L 67/1095 |
| 2017/0214661 A1* | 7/2017 | Wood | H04L 63/0428 |

OTHER PUBLICATIONS

Microsoft Corporation, "Quality of Service Technical White Paper", Mar. 13, 2000, 51 pages.

S. Amante et al., "IPv6 Flow Label Specification", Internet Engineering Task Force (IETF), Request for Comments: 6437, Obsoletes: 3697, Updates: 2205, 2460, Category: Standards Track, ISSN: 2070-1721, Nov. 2011, 15 pages.

J. Manner et al., "Analysis of Existing Quality-of-Service Signaling Protocols", Network Working Group, Request for Comments: 4094, Category: Informational, May 2005, 45 pages.

Cisco Systems, Inc., "Understanding Logical Link Control", Document ID: 12247, Sep. 9, 2005, 13 pages.

* cited by examiner

FIG. 6A
NAME ELEMENT

| NAME-TYPE | NAME-LENGTH | NAME-VALUE | |
|---|---|---|---|
| | | NAME COMPONENT ELEMENT 608-1 ... NAME COMPONENT ELEMENT 608-X | |
| 602 | 604 | 606 | |

600

FIG. 6B
NAME COMPONENT ELEMENT WITH ECNCT (CCN)

| NAME-COMPONENT-TYPE (ECNCT) | NAME-COMPONENT-LENGTH | NAME-COMPONENT-VALUE |
|---|---|---|
| 612 | 614 | 616 |

610

FIG. 6C
NAME COMPONENT ELEMENT WITH ECNCT (NDN)

| NAME-COMPONENT-TYPE | NAME-COMPONENT-LENGTH | NAME-COMPONENT-VALUE | |
|---|---|---|---|
| | | ECNCT MARKER 627 | NAME COMPONENT DATA 629 |
| 622 | 624 | 626 | |

| /com | /youtube | /<mediaID> | /video or /audio | /<frameID> | /<segment#> |
|---|---|---|---|---|---|
| Name Component type | Name Component type | Flow Component Type | Flow Component Type | Object Component Type | Segment Component type |

700

702

704

706

FLOW CLASSIFICATION FOR INFORMATION CENTRIC NETWORK PROTOCOLS

TECHNICAL FIELD

This disclosure relates in general to the field of Information Centric Networking (ICN), and more particularly, to flow classification for ICN protocols.

BACKGROUND

Information-Centric Networking (ICN) represents a broad research direction for moving the Internet toward a content/information/data centric network architecture. At least some future network architecture possibilities for ICN are based on empirical research related to network usage and the desire to overcome problems with existing architectures such as Internet Protocol. ICN and its specific architecture designs, such as Named Data Networking (NDN) and Content Centric Networking (CCN), offer a fundamentally different approach in supporting information dissemination over any type of networks. CCN and NDN are content-based (or data-oriented) networking rather than host-oriented networking. The flow of messages through a CCN or NDN network is based on the names of the content in the messages rather than numerically addressed hosts. Identifying groups of messages that get consistent treatment in an ICN network, where the flow of messages is not based on numerically addressed hosts, presents a significant challenge to traffic engineers and administrators alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 6A-6C illustrate possible formats for names and name components in interest and data packets in the ICN environment in which flow classification is implemented, according to at least one embodiment;

FIG. 7 is a table showing an example name and possible marked name components, according to at least one embodiment;

DETAILED DESCRIPTION OF EMBODIMENTS

Overview

Figure 1:
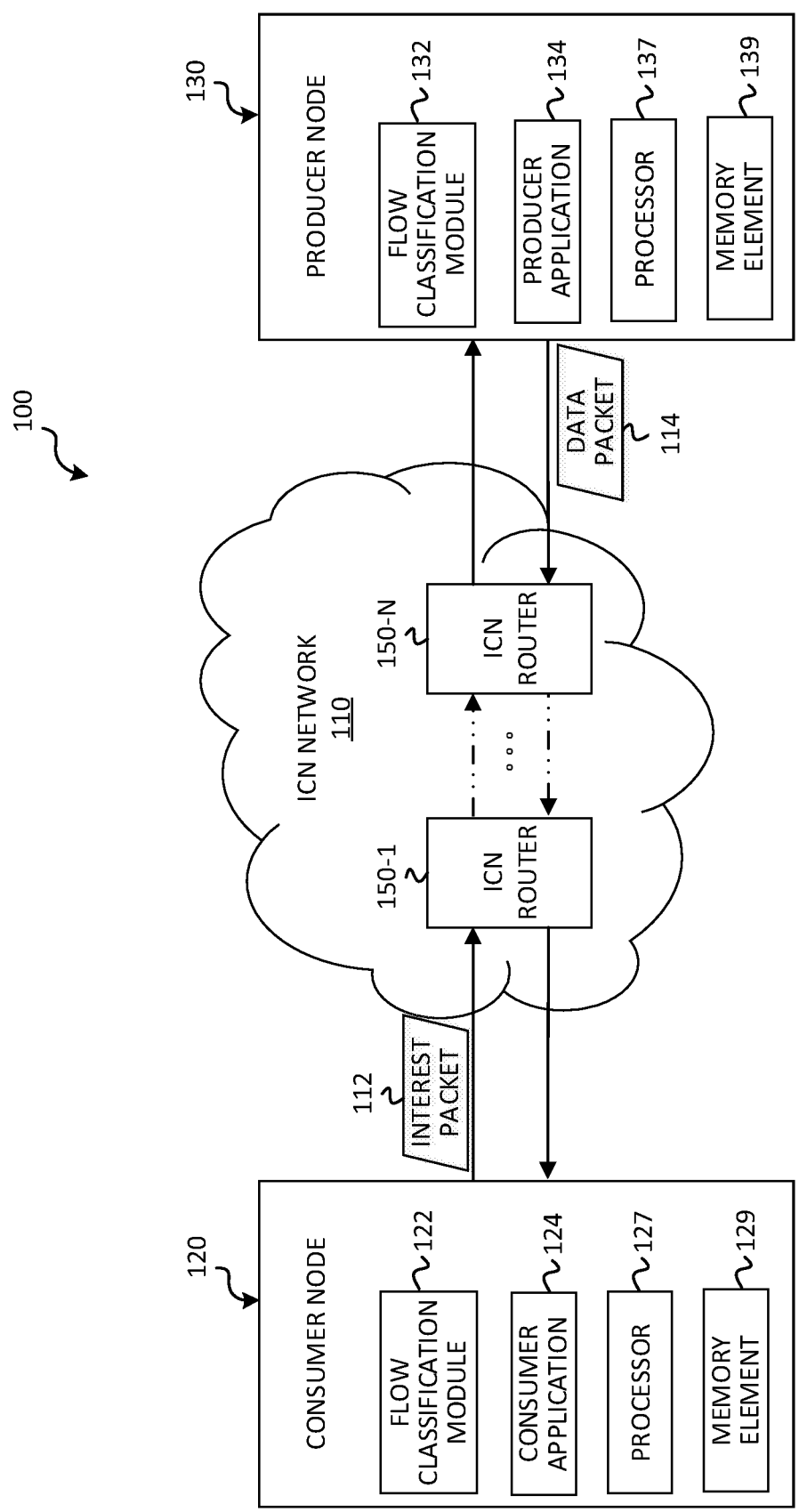
FIG. 1 is a simplified block diagram of an Information-Centric Networking (ICN) environment in which flow classification is implemented according to at least one embodiment of the present disclosure.

The present disclosure describes methods of flow classification in an Information-Centric networking (ICN) architecture. In one example in the present disclosure, a method includes identifying an equivalence class identifier in a packet received by a node configured to perform information centric networking (ICN) in an ICN network, where the packet includes a name identifying content associated with a producer node in the ICN network. The method also includes determining an equivalence class for the packet by determining a name prefix of the name based, at least in part, on the equivalence class identifier, and taking an action affecting a particular packet, where the action is based, at least in part, on the equivalence class. The packet can be an interest packet or a data packet. The particular packet can be an interest packet or a data packet. The particular packet can be the packet in which the equivalence class identifier is identified, or the particular packet can be another packet.

In more specific embodiments, the name includes a plurality of name components, and the equivalence class identifier is a count indicating a number of name components in the name to be grouped together to determine the name prefix. In even more specific embodiments, the name prefix includes a group of name components identified by sequentially counting the number of name components in the name, where a beginning name component in the group of name components corresponds to a beginning name component in the name. In more specific embodiments, the number is greater than a particular number of name components in a routable name prefix of the name. In yet further embodiments, a count element in the packet includes a type field, a length field, and a value field, and the count is stored in the value field of the count element. In one particular embodiment, the equivalence class identifier is stored in a first portion of the packet that is different from a second portion of the packet in which the name is stored. Further embodiments can include, prior to the producer node creating the packet, determining a prior count is to be replaced by the count if a determination is made to dynamically change the equivalence class of the packet, and storing the count in the packet.

Other particular embodiments can include identifying a name component of a plurality of name components in the name, and identifying a group of name components in the plurality of name components based on the identified name component, where the identified name component is the last one of the group. A name component element in the packet can include a type field and a value field, where the equivalence class identifier is stored in the type field and the identified name component is stored in the value field. In a specific embodiment, a name component element is one of a plurality of name component elements stored in a value field of a name element in the interest packet. In another specific embodiment, the equivalence class identifier is stored in a first portion of a value field of a name component element in the interest packet, and the identified name component is stored in a second portion of the value field. The equivalence class identifier may be a constant string in the second portion of the value field. A more specific embodiment can include identifying one or more other equivalence class identifiers in the packet and determining one or more other equivalence classes for the packet by determining one or more other name prefixes of the name based, at least in part, on the one or more other equivalence class identifiers.

Some or all of the elements, operations, and features may be included in respective systems, apparatuses, and devices for performing the described functionality. Furthermore, some or all of the features may be implemented in at least one machine-readable storage medium.

Description

FIG. 1 is a simplified block diagram of an Information-Centric Networking (ICN) environment 100 in which flow classification embodiments presented herein may be implemented. FIG. 1 includes a consumer node 120 and a producer node 130, which communicate over an Information-Centric Networking (ICN) network 110. The ICN network can include multiple ICN routers 150-1 through 150-N, and/or any other network elements capable of routing, forwarding, receiving, and/or responding to messages in accordance with ICN protocols. In at least one example, consumer node 120 can include a flow classification module 122, a consumer application 124, a processor 127, and a memory element 129. Producer node 130 can include a flow classification module 132, a producer application 134, a processor 137, and a memory element 139.

In one example implementation, the ICN network may be implemented using a Named Data Networking (NDN) architecture and ICN routers 150-1 through 150-N may route packets based on NDN protocols. In another example implementation, the ICN network may be implemented using a Content Centric Networking (CCN) architecture and ICN routers 150-1 through 150-N may route packets based on CCN protocols. Although NDN and CCN are examples of possible ICN networks in which flow classification embodiments may be implemented, it will be apparent that the broad principles of the flow classification embodiments described herein may be applied to other types of ICN networks (e.g., MobilityFirst, PURSUIT, etc.) to achieve the intended functionality.

For purposes of illustrating certain example techniques of flow classification embodiments in ICN network environment 100, it is important to understand the communications that may be traversing the network and the protocols used in effecting such communications. The following foundational information may be viewed as a basis from which the present disclosure may be properly explained.

Information-Centric Networking (ICN) offers a fundamentally different approach for information dissemination in a network environment. This approach involves a content/information/data centric network architecture. Content Centric Networking (CCN) and Named Data Networking (NDN) are examples of ICN architectures, each of which can be used as the underlying architecture for implementing flow classification embodiments described herein. CCN and NDN are based on the premise that the flow of messages through a network is based on the name of the content of the messages. This contrasts with current Internet Protocol (IP) based networks in which messages are routed based on numerically addressed hosts and a connection is secured based on the connection between communicating hosts.

In an ICN network, rather than identifying packets traversing a network based on source and destination addresses, packets are identified based on their named content. When responding to requests, ICN routers do not look up information based on where the source and destination are, but instead look up a content request based on an identifier (e.g., a name) of the content. Thus, when requested by name in an ICN network, the named content can be delivered to the requesting client from any node storing an instance of the named content, including the nearest cache, thereby traversing fewer network hops and eliminating redundant requests.

Communication in an ICN network is typically driven by consumers that initiate requests for information through the exchange of messages. In NDN and CCN protocols, there are two basic messages, an interest message (e.g., interest packet 112), which requests a piece of content via a hierarchical tokenized name, and a data message (e.g., data packet 114), which returns the requested named piece of content. Names are the only identifiers in the protocols; neither source addresses nor destination addresses are employed. Exactly one data message is generated to respond to each interest message. This produces a useful property known as "flow balance". Flow balance enables flow identification to be tied directly to the interest/data exchanges. Interest message and data message are also referred to herein as 'interest packet' and 'data packet', respectively.

A namespace allows content to be referenced by name in interest and data packets. The namespace is hierarchical and carries semantic information. An ICN name is a hierarchical name for content and contains a sequence of name components. For example, /com/youtube/<mediaID>/audio/<frameID>/<segment#> contains six name components with each one delineated by a slash. For a data item to be globally accessible, the data item is assigned a globally unique name. When a client wants particular data (also referred to herein as 'consumer'), the client can generate an interest packet that includes the name of the desired data. In at least some instances, the name of the requested data may be provided by a user or process that intends to consume the data.

NDN and CCN routers use the name to forward the interest packet toward the desired data. The desired data may be found at the source that produced the data (also referred to herein as 'producer') or at other nodes along a path to the source. A node between the source and the client may have stored the data if the data passed through the node one or more times.

When an interest packet reaches a node that contains the desired data (e.g., either a producer node or another node along a path to the producer node), the node can generate a data packet that includes the name and the data. In addition, the data packet may also be signed with the content publisher's key. To reach the consumer, the data packet follows the reverse path taken by the interest packet.

Flow identification is an important capability for any network protocol family, including ICN protocols. In IP-based networks, the problem of identifying groups of messages to get consistent treatment in a network and allow that treatment to be independent and isolated from the treatment of other groups of packets, is ubiquitous and long-standing. The purposes to which this identification can be put is highly varied, including such functions as providing differentiated quality of service, traffic engineering, traffic filtering for security functions like intrusion detection and firewalling, etc. The ability to identify groups of messages in NDN and CCN networks can be similarly advantageous.

Providing the capability to apply different functions to groupings (also referred to herein as 'equivalence classes') of packets is generally known as a 'flow identification problem' where the definition of what constitutes a 'flow' is dependent on the particular protocol or protocols carrying the packets. Some of the above uses of flows require that the flow identification technique also have the ability to apply some useful notion of fairness among the instances of each equivalence class. Possible flow identification techniques are generally either too granular (spatially or temporally) to establish fairness, or conversely, too coarse to separate traffic at a fine enough level to achieve useful fairness.

In existing Internet protocols such as Transmission Control Protocol (TCP), User Datagram Protocol (UDP), and Internet Protocol (IP), flows are conventionally identified by a '5-tuple' of source and destination IP addresses, source and destination port, and protocol type in an IP packet. Some systems augment this by further distinguishing equivalence classes by the type of service/Differentiated Services Code Point (TOS/DSCP) field. Two-party flows are present where the source and destination addresses are unicast IP addresses. Multi-party flows can exist when the destination IP address is a multicast address. One key common characteristic is that the identification of flows depends on the presence of source addresses in the packets, and the limited richness of IP addresses is correspondingly constraining as a means to classify traffic in a semantically meaningful way.

Certain fundamental differences exist between ICN systems and IP-based designs. These differences prevent flow identification techniques used in IP-based systems from being useful in ICN systems. For example, NDN packets do not contain source addresses of any kind, which means that identifying flows as groups of packets between a single pair of endpoints (in the unicast case) is not generally possible for intermediate routers in an ICN system, except for possibly the first-hop router if it serves a single consumer per interface. In another example, instead of group-based multicast used in IP-based systems, ICN systems use multi-destination delivery semantics. Furthermore, in IP-based systems, Internet-wide multicast has been difficult to use at least partly because there is no good way to make use of flow identification for multicast flows.

The flow balance property of ICN networks enables flow identification to be tied directly to the interest/data message exchanges. One approach is to treat all packets forwarded through the same routable name prefix as one flow. Simply using the routing state that maps name prefixes to routes, however, does not provide a particularly useful set of equivalence classes. This is because, in at least some instances, routing prefixes are too coarse to be useful; many equivalence classes of packets are generally covered by a single routing prefix because they are present at the same set of destinations from a routing perspective. Moreover, it is desirable for practical, scalable routing to do route aggregation, which further blurs the discrimination of the equivalence classes.

In another example for ICN networks, 'user ids' or 'flow ids' or some form of source address could be added to packets. This approach, however, essentially negates the advantages of having an architecture that eschews the identification of the source of packets. Adding a form of source address to packets in an ICN network sacrifices one or more of the fundamental properties of native ICN protocols. Therefore, an efficient approach to identify flows in an ICN system (e.g., NDN, CCN, etc.) is needed that both relates to the name structure but also provides finer granularity.

Flow classification embodiments described in this disclosure can resolve the aforementioned issues (and more) associated with classifying flows in an ICN environment, such as NDN and CCN. In general, embodiments described herein provide semantics that map well with expected uses of ICN to build applications. Embodiments are designed to prevent having to change the protocol architecture in ways that affect the semantics or utility of an ICN approach to networking. The flow balance property of ICN networks enables flow identification to be tied directly to the interest/data message exchanges. In order to have useful flow identification in an ICN network, embodiments described herein can associate equivalence classes with names in corresponding interest and data messages. Embodiments can also maintain stability over multiple exchanges using different names that share some common 'handle' or 'name prefix' that can be used to group the names into equivalence classes.

More specifically, flow classification embodiments use a notion of packet equivalence classes, which are identified using protocol encoding techniques. In a first example protocol encoding technique, equivalence class identifiers can be encoded directly in the name, by adding a specialized name component type to the name of the data packet. This typed name component is referred to herein as 'equivalence class name component type', 'name component type', or 'ECNCT'. The ECNCT can be set by the producer as part of constructing all data packets in the desired equivalence class. In at least one embodiment, an ECNCT can be immutable for the lifetime of the associated named data. In at least some embodiments, the ECNCT can also be present in interest packets. In addition, the name of a particular data item can have multiple equivalence class markings. An equivalence class name component can explicitly indicate an equivalence class and can implicitly make all data packets that are marked below it in the hierarchy, part of that equivalence class. Thus, the name can have multiple equivalence class markings to define a hierarchy of flows.

In a second example protocol encoding technique, an equivalence class identifier can be encoded as a new element in the data packets. The equivalence class identifier in this embodiment is referred to herein as 'equivalence class component count', 'count', or 'EC3'. The count can be set by the producer and indicate the number of name components in a corresponding name that, when grouped together under the same prefix part of the name, are to be considered one equivalence class instance. This allows either finer or coarser granularity than provided by routable name prefixes. Because the EC3 is a separate portion of the packet, producers can 'regroup' equivalence classes dynamically by including more or fewer levels of the name hierarchy when they respond to interest packets with corresponding data packets. This separate portion of the packet can include three fields in at least one embodiment in which type-length-value formatting is used. In this specification, an EC3 and an ECNCT are each referred to more generally as an 'equivalence class identifier'.

Several advantages are provided by the flow communication embodiments shown and described herein. Flow classification embodiments described herein allow ICN systems to perform flow identification at any desired granularity of a routable name prefix and beyond the routable name prefix. Embodiments described herein permit both consumer nodes and routers to use equivalence classes to perform per-flow functions. The encoding to achieve the flow classification embodiments described herein is lightweight and does not require changes to the protocol architecture in ways that affect the semantics or utility of an ICN approach to networking. Furthermore, equivalence classes can be specified by the data producer, in contrast to IP protocols in which the data producer can only control the destination port as an equivalence-class discriminator.

Turning to FIG. 1, a description of the infrastructure of ICN environment 100 is now provided. Generally, ICN environment 100 can include one or more networks, such as ICN network 110, which represent a series of points or nodes of interconnected communication paths for receiving and transmitting messages (e.g., packets of information) that propagate through the one or more networks. These nodes offer communicative interfaces between nodes (e.g., consumer node 120, producer node 130, ICN routers 150-1 through 150-N, etc.). A network, such as ICN network 110, can comprise any number of hardware and/or software elements coupled to (and in communication with) each other through a communication medium. Such networks can include, but are not limited to, any local area network (LAN), virtual local area network (VLAN), wide area network (WAN) such as the Internet, wireless local area network (WLAN), metropolitan area network (MAN), Intranet, Extranet, virtual private network (VPN), any other appropriate architecture or system that facilitates communications in a network environment or any suitable combination thereof.

These networks through which communications propagate in ICN environment 100, can use any suitable technologies for communication including wireless (e.g., 3G/4G/5G/nG network, WiFi, Institute of Electrical and Electronics Engineers (IEEE) Std 802.11™-2012, published Mar. 29, 2012, WiMax, IEEE Std 802.16™-2012, published Aug. 17, 2012, Radio-frequency Identification (RFID), Near Field Communication (NFC), Bluetooth™ etc.) and/or wired (e.g., T1 lines, T3 lines, digital subscriber lines (DSL), Ethernet, etc.) communication. Generally, any suitable means of communication may be used such as electric, sound, light, infrared, and/or radio.

In FIG. 1, ICN network 110 represents the one or more networks in which flow classification embodiments described herein may be provisioned. In at least some embodiments, the ICN network can be configured with an NDN architecture. In other embodiments, flow classification embodiments would be equally applicable to other ICN architectures, such as Content Centric Networking (CCN), for example. ICN network 110 may include network elements, such as routers 150-1 through 150-N, to facilitate network communications between consumer nodes and producer nodes. In an NDN architecture, the routers and other nodes may be configured to accommodate an NDN protocol. In a CCN architecture, the routers and other nodes may be configured to accommodate a CCN protocol.

ICN network 110 may include a configuration capable of using a network communication protocol for the transmission and/or reception of packets in a network. Packets can be inclusive of messages, frames, signals, data, content, objects, requests, queries, responses, replies, etc., and can be sent and received in ICN network 110 according to any suitable communication messaging protocols, such as the name-prefix based routing protocol. ICN network 110 may also operate in conjunction with any other suitable protocol, where appropriate and based on particular needs. The terms 'data' and 'content' as used herein, refer to any type of binary, numeric, voice, video, textual, photographic, or script data, or any type of source or object code, or any other suitable information in any appropriate format that may be communicated from one point to another in computing systems (e.g., servers, nodes, routers, computing devices, client nodes, source nodes, consumer nodes, producer nodes, etc.) and/or networks.

Routers 150-1 through 150-N shown in ICN network 110 are network elements that can facilitate network communications between consumer nodes, producer nodes, and other network elements in a given network. As used herein, the term 'network element' is meant to encompass routers, switches, gateways, bridges, load balancers, firewalls, inline service nodes, proxies, servers, processors, modules, or any other suitable device, component, element, proprietary appliance, or object operable to exchange information in a network environment, such as ICN environment 100. This network element may include any suitable hardware, software, components, modules, interfaces, or objects that facilitate the operations thereof. This may be inclusive of appropriate algorithms and communication protocols that allow for the effective exchange of data or information.

Consumer node 120 and producer node 130 are examples of any number of possible consumer nodes and producer nodes provisioned in ICN environment 100. Consumer node 120 can include one or more consumer applications, such as consumer application 124, to request data from the ICN network. In at least one embodiment, flow classification module 122 may be provisioned in consumer node 120 (separate from or integral to) the consumer application to enable identification of flow classification in data packets and/or to enable marking interest packets according to certain flow classification embodiments. For example, in an EC3 flow classification embodiment, marking packets via flow classification module 122 may be optional because routers (e.g., ICN router 150-1 through 150-N) have the necessary state to map an interest name to a data name and an equivalence class. In an ECNCT flow classification embodiment, however, flow classification module 122 may be configured to know (or access) the name schema with equivalence class mapping, and to appropriately mark interest packets to enable ICN routers to match interest and data names.

Producer node 130 can include one or more producer applications, such as producer application 134, to produce (e.g., create, generate, obtain, etc.) and store data that is responsive to interest messages. In at least one embodiment, flow classification module 134 may be provisioned in producer node 130 (separate from or integral to) the producer application to enable identification of names and possibly equivalence class identifiers in interest messages and/or to enable marking responsive data messages according to particular flow classification embodiments.

The term 'node' is inclusive of devices used to initiate and/or respond to communications (e.g., interest packets, data packets, etc.) in a network, such as desktop computers, laptop computers, mobile devices, smart phones, tablets, electronic notebooks, vehicle infotainment systems, gaming systems, smart TVs, or any other device, component, element, or object capable of voice, audio, video, media, or data exchanges within ICN environment 100. A node may also be inclusive of network elements. Some nodes include a suitable interface to a human user, such as a display, a keyboard, a touchpad, a remote control, or other terminal equipment. Additionally, a node may be any device that can communicate on behalf of another entity or element, such as a program, a database, or any other component, device, element, or object capable of initiating an exchange within ICN environment 100.

In at least some embodiments, consumer node 120, and possibly producer node 130, can be associated with users that communicate in ICN environment 100 via some network. In other instances, one or both of consumer node 120 and producer node 130 may facilitate data exchanges via ICN network 110 while operating independently of user interactions. Although various functions are described herein as relating to either a consumer node or a producer node, it will be apparent that a node could be configured to act as both a producer and a consumer. For example, a video conference call established over ICN network 110 could include nodes associated with respective users, and configured to act as both producers and consumers of the video content. Thus, components of consumer node 120 and producer node 130 may be provisioned in any suitable arrangement or configuration to achieve the operational features of a consumer node, a producer node, or a suitable combination thereof.

In at least one implementation, routers 150-1 through 150-N, consumer node 120, and producer node 130 each include software to achieve (or to foster) flow classification, as outlined herein. Note that in one example, each of these elements can have an internal structure (e.g., a processor, a memory element, etc.) to facilitate some of the operations described herein. In other embodiments, these flow classification operations may be executed externally to these elements, or included in some other network element to achieve this intended functionality. Alternatively, these elements may include this software (or reciprocating software) that can coordinate with other network elements in order to achieve the operations, as outlined herein. In further embodiments, these elements may include any suitable algorithms, hardware, software, firmware, components, modules, interfaces, or objects that facilitate the operations thereof.

Figure 2:
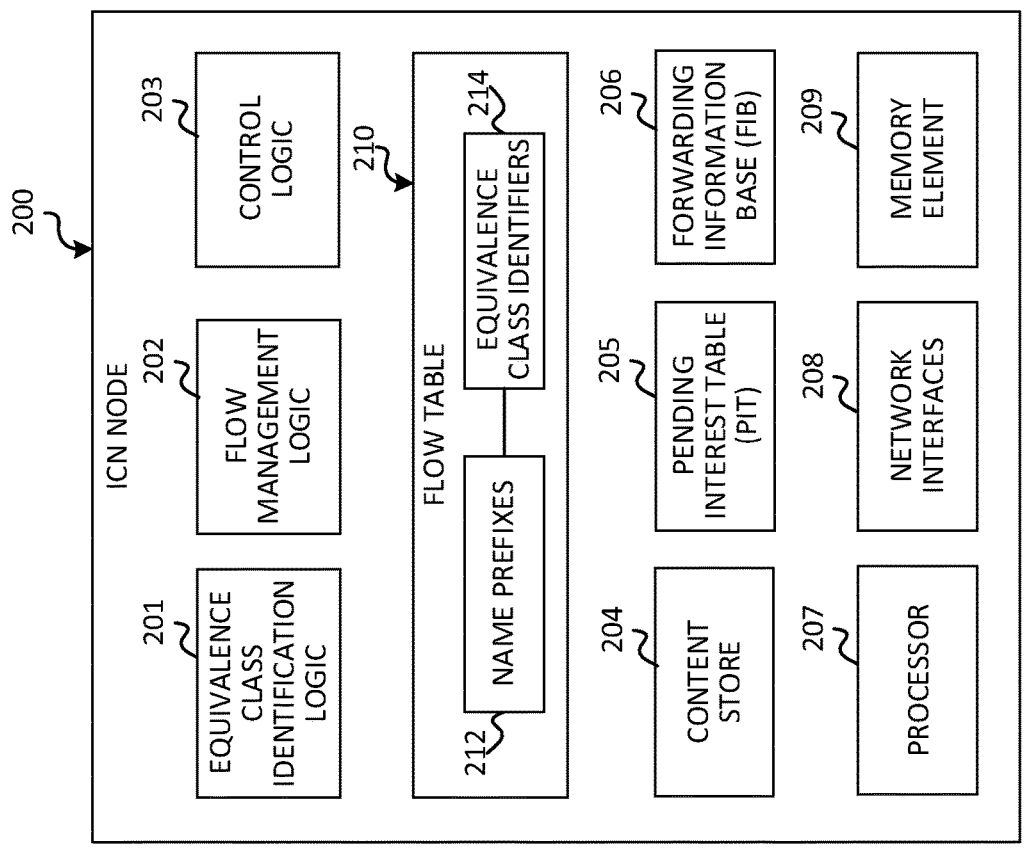
FIG. 2 is a simplified block diagram of an example ICN node that is configured to operate in the ICN environment according to at least one embodiment.

Turning to FIG. 2, a simplified block diagram of an example ICN node 200 that, in at least some flow classification embodiments, is representative of one or more of routers 150-1 through 150-N in ICN network 110. ICN node 200 is a network element that includes interest and data packet forwarding capabilities in addition to computing and data processing capabilities to implement flow classification embodiments. ICN node 200 could be implemented using NDN, CCN, or other suitable ICN protocols. In at least one embodiment, ICN node 200 can include equivalence class identification logic 201, flow management logic 202, control logic 203, a content store 204, a pending Interest table (PIT) 205, a forwarding information base (FIB) 206, and a flow table 210.

ICN node 200 may also include appropriate hardware including, but not limited to, one or more processors (e.g., processor 207), one or more network interfaces (e.g., network interfaces 208), and one or more memory elements (e.g., memory element 209). Network interfaces 208 can receive and forward/transmit interest and data packets. Control logic 203 may provide overall control of ICN node 200. Control logic 203 may also include or cooperate with a forwarding strategy module (not shown) to implement an adaptive forwarding strategy, which determines whether, when and where to forward each interest packet.

ICN node 200 can maintain at least three data structures. First, Pending Interest Table (PIT) 205 is provided to store entries for interest packets that ICN node 200 has forwarded but not yet satisfied. Each entry can include the name of data requested in the interest packet, along with incoming and outgoing interfaces. Second, Forwarding information Base (FIB) 206 is populated with a name-prefix based routing protocol, which can be manually configured in at least some embodiments. Multiple output interfaces may be provided for each name-prefix. Finally, content store 204 may store a temporary cache of data packets received from, for example, a data producer or another upstream NDN router. The data packets can be cached to satisfy future interests.

Equivalence class identification logic 201 can be configured to identify equivalence classes, based on the type of flow classification embodiment implemented in ICN node 200. In a flow classification embodiment that implements a typed name component (ECNCT) in a name of an interest or data packet, logic 201 can identify the one or more marked name components in the interest or data message. The one or more marked name components can be used to identify one or more groups, respectively, of name components in the name of the packet. An identified group of name components in a sequence can define a name prefix as an equivalence class for a flow or object in the name. The packet can be associated with each of the equivalence classes corresponding to the one or more groups of name components. The packet can be treated similarly to other packets of the same equivalence class. Actions taken may affect the packet and may be based, at least in part, on a policy related to the particular equivalence classes associated with the packet.

In a flow classification embodiment that implements a name component count field (EC3), equivalence class identification logic 201 can determine the equivalence class component count in a data message and use the count to identify a group of name components in the name of the data message. An identified group of name components in a name can define a name prefix as an equivalence class for a flow or object in the name. The data packet can be associated with the equivalence class corresponding to the identified group of name components. Actions taken may affect the packet and may be based, at least in part, on a policy related to the particular equivalence class.

In at least one embodiment, flow table 210 may be provisioned in ICN node 200 to enable the node to make decisions about performing actions on interest and/or data packets based on one or more equivalence classes. In one embodiment, flow table 210 can include name prefixes 212 mapped to equivalence class identifiers 214 obtained from previous interest-data exchanges. In an embodiment where interest packets carry the equivalence class identifier, flow table 210 may only include name prefixes. Typically, name prefixes in flow table 210 are more granular than prefixes in the FIB, but less granular than names in the PIT. Flow table 210 could be separate from other elements of ICN node 200 or could be integrated with equivalence class identification logic 201, FIB 206, or another element or elements of ICN node 200 based on particular needs and implementations.

Flow management logic 202 can be configured to treat flows having the same equivalence class similarly. Actions taken that are related to flows or objects having a similar equivalence class can include, but are not limited to, dropping a packet, using a particular interface for a packet, security related actions (e.g., filtering traffic for security functions like intrusion detection and firewalling), quality of service (QoS) related actions (e.g., types of resources to allocate to the packets, placing a packet on a particular queue for forwarding purposes, etc.), and/or traffic engineering (e.g., selecting one path over another path). Flow management logic 202 can enable such actions to be taken on a particular flow based on the equivalence class associated with the flow or object and policies related to the equivalence class.

Specific examples of how ICN node 200 can use the knowledge of equivalence classes of packets include, but are not limited to, the following:

(1) Enforce rate control for the equivalence class as a whole (e.g., dropping packets, queuing packets, etc.);
(2) Estimate the number of simultaneous flows traversing a bottleneck link, which can improve the performance of many congestion control schemes; and
(3) Make more intelligent selections of which packets to cache at the router, for example, to prefer to cache many packets of the same equivalence class.

It should be noted that examples of processing and operations of ICN node 200, which are related to flow classification embodiments described herein, may be performed in a similar or identical manner by routers configured to accommodate NDN, CCN or any other suitable other ICN protocols.

Consumer nodes (e.g., consumer node 120) may also use the knowledge of equivalence classes of packets to take certain actions. For example, when a data packet with a name specifying a particular equivalence class arrives at a consumer node in response to a previously sent interest packet, the consumer node can associate the data packet with the correct equivalence class. Consequently, the consumer node can manage subsequent interest/data exchanges with the same name prefix and equivalence class identifier (e.g., EC3 or ECNCT) as one flow. Associated measurements such as round trip time (RTT) or marginal delay can be leveraged to perform flow and congestion management for the equivalence class as a whole.

Figure 3:
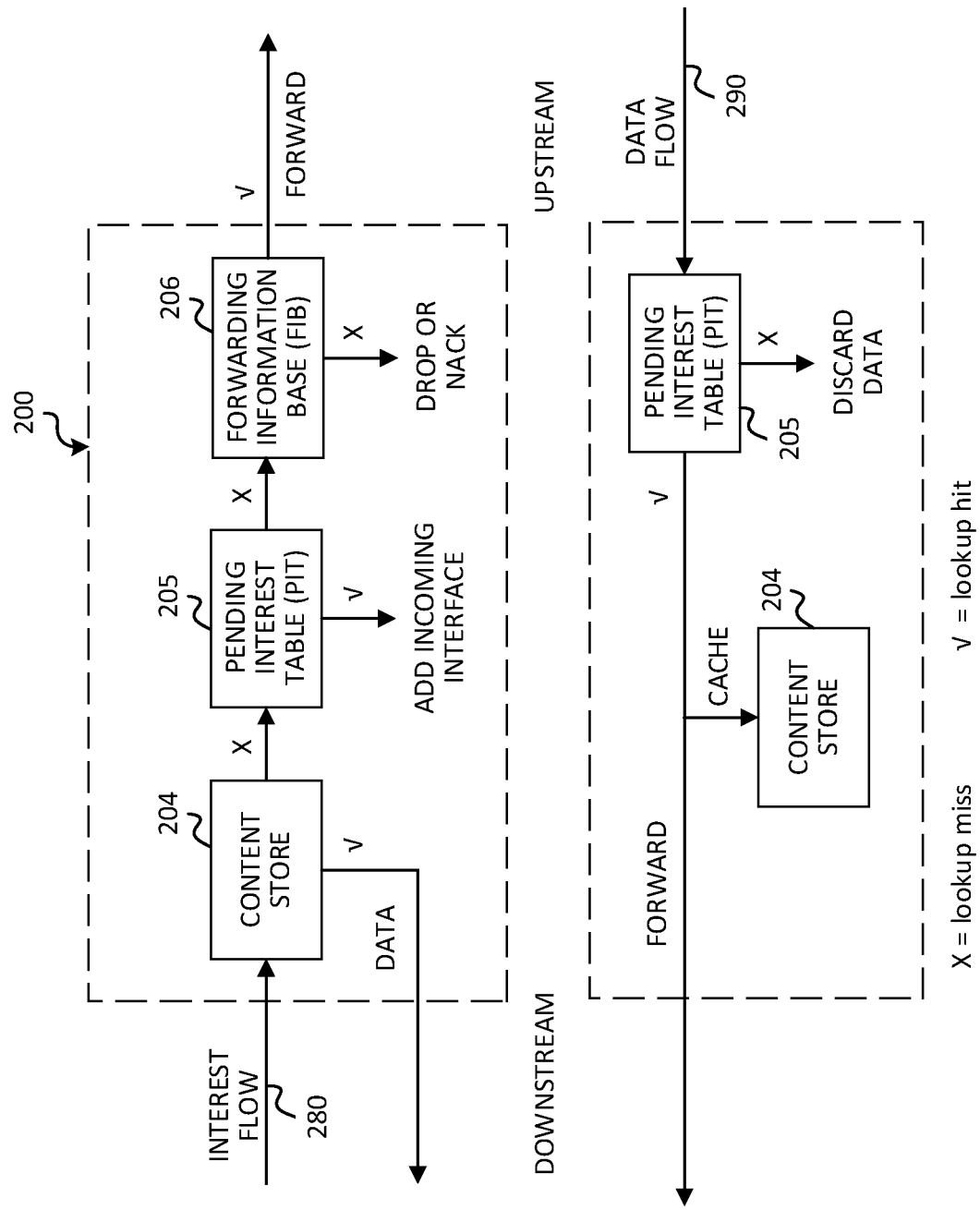
FIG. 3 is a simplified block diagram of example interest and data flow paths through the ICN node of FIG. 2, according to at least one embodiment.

Turning to FIG. 3, the general operation of ICN node 200 is now described. An interest flow 280 is shown through ICN node 200 in an upstream direction from a consumer node to a producer node (or upstream router). A data flow 290 is shown through ICN node 200 in a downstream direction from the producer node (or upstream router) to the consumer node. When ICN node 200 receives an interest packet, content store 204 is checked for matching data. If matching data is found, a data packet can be returned on the interface from which the interest packet was received. If matching data is not found in content store 204, ICN node 200 can look up the name in PIT 205. If a matching entry is found, the incoming interface of the Interest packet is recorded in the matching PIT entry. If a matching entry is not found, ICN node 200 forwards the interest packet toward the producer node based on information in FIB 206.

The forwarding strategy module may also be used to determine the route for forwarding. If ICN node 200 receives multiple interest packets containing the same name from multiple downstream consumer nodes, ICN node 200 may forward only one interest packet (e.g., the first one received) toward the producer node. FIB 206 can be populated by a name-prefix based routing protocol, and can have multiple output interfaces for each prefix. The population of FIB 206 can be achieved using any suitable techniques including, but not limited to automatic or manual configuration. In certain implementations, for each interest packet, the forwarding strategy module retrieves the longest prefix matched entry from FIB 206. The longest prefix matched entry can then be used to determine where to forward the interest packet. It should be apparent that other suitable forwarding strategies could be used depending on particular needs and/or implementations.

When ICN node 200 receives data packet, ICN node 200 finds the matching entry in PIT 205 and forwards the data to all downstream interfaces listed in the matching entry of PIT 205. The matching entry is then removed from PIT 205. The data packet can be cached in content store 204. Data packets take the reverse path of interest packets. Host and interface addresses are not stored in interest or data packets. Rather, ICN node 200 forwards interest packets toward data producers based on the names contained in the interest packets, and forward data packets to consumer nodes based on the PIT state information established by interest packets. If no packet losses occur, one interest packet results in one data packet on each link, which provides flow balance. Thus, the need for source or destination node information in interest or data packets can be eliminated.

Figure 4A:
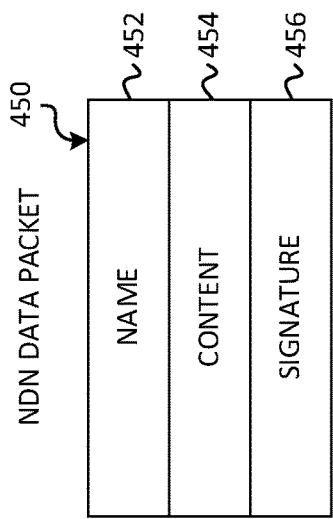
FIGS. 4A and 4B are illustrations of example interest and data packets for a Named Data Networking (NDN) architecture, according to at least one embodiment.

Turning to FIG. 4A, FIG. 4A is an illustration of an example interest packet 400 having a format that can support at least one flow classification embodiment implemented using an NDN protocol as described herein. Interest packet 400 includes a name 402 that identifies the requested data, and a nonce 404 used with name 402 to uniquely identify the interest packet. Interest packet 400 can be encoded in a type-length-value (TLV) format. Generally, a TLV format includes a type field, a length field and a value field. A type field contains a type of data that is carried in the value field. A length field contains the length of the value field. In other embodiments, the length field may contain the length of the TLV (i.e., the packet). Finally, a value field contains the data being processed. In an example, interest packet 400 can be encoded in a TLV format as follows:

INTEREST:=INTEREST-TYPE TLV-LENGTH INTEREST-VALUE
INTEREST-VALUE:=Name
   Nonce

The interest-value field of interest packet 400 can also include other elements. For example, selectors 408 may be placed after the name to facilitate implementations using a continuous memory block of name 402 and selectors 408 together as the index for a PIT lookup. In another example, an interest lifetime 406 may be placed in the interest-value field. Interest lifetime 406 can affect forwarding behavior, such as how long an interest packet may be kept in PIT 205. It should be noted that NDN interest and data packets could contain additional elements and fields not represented in FIGS. 4A and 4B depending on particular needs and implementations.

Figure 4B:
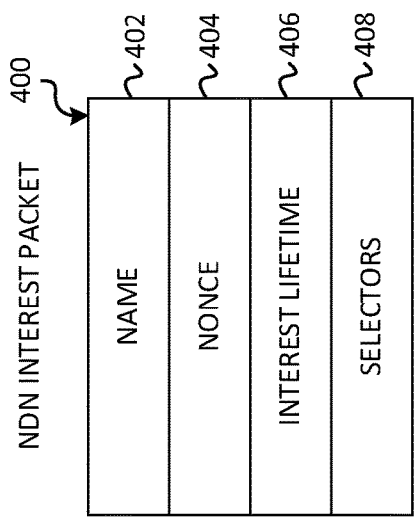

FIG. 4B is an illustration of an example data packet 450 having a format that can support at least one flow classification embodiment implemented using a NDN protocol as described herein. Data packet 450 includes a name 452 that identifies the data being transmitted by the data packet, content 454 that contains the data being transmitted, and a signature 456 of the elements in the data packet (e.g., name 452 and content 454). Data packet 450 can be defined using type-length-value (TLV) format as previously described generally, and more specifically as follows:

DATA:=DATA-TYPE TLV-LENGTH DATA-VALUE
DATA-VALUE:=Name
   Content
   Signature

In some implementations, data packet 450 can also include other elements. For example, additional bits of information termed 'metainfo' may be placed after the name and included in the signature. Metainfo could include, for example, a content type, a freshness period to indicate how long a node should wait after the arrival of this data before marking it as stale, and a final block identifier to indicate the identifier of the final block in a sequence of fragments. The content type could indicate the content as, for example, a payload identified by the data name, another name that identifies the actual data content, a public key, or an application-level NACK.

Figure 5A:
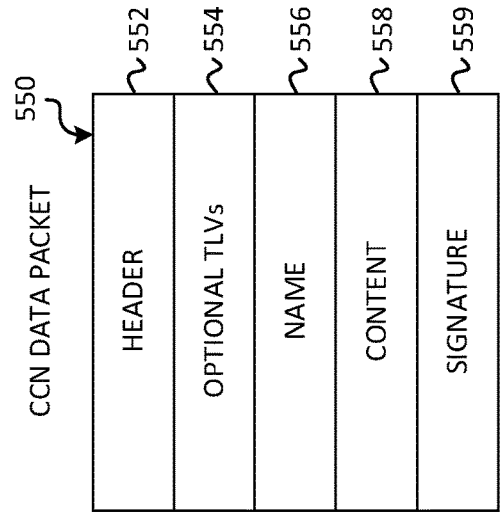
FIGS. 5A and 5B are illustrations of example interest and data packets for a Content Centric Networking (CCN) architecture, according to at least one embodiment.

Turning to FIG. 5A, FIG. 5A is an illustration of an example interest packet 500 having a format that can support at least one flow classification embodiment implemented using a CCN protocol as described herein. Interest packet 500 includes a packet header 502, optional time-length-value (TLV) elements 504, and a name 506 that identifies the requested data. Interest packet 500 may include elements (e.g., optional TLVs 504, name 506, etc.) encoded in a type-length-value (TLV) format, but the packet itself may not be encoded in a TLV format. In some implementations, interest packet 500 can also include other elements. For example, other elements could include, but are not limited to, a validation algorithm, a validation payload and a metadata element.

Figure 5B:
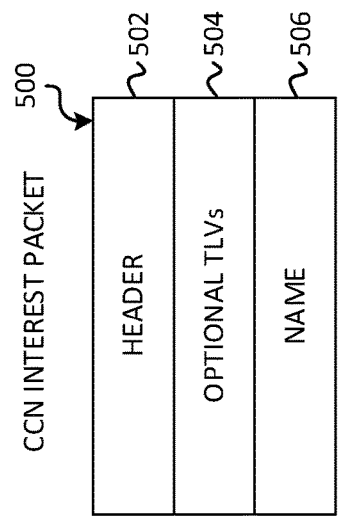

FIG. 5B is an illustration of an example data packet 550 having a format that can support at least one flow classification embodiment implemented using a CCN protocol as described herein. Data packet 550 includes a packet header 552, optional time-length-value (TLV) elements 554, a name 556 that identifies the data being transmitted in the data packet, content 558 containing the data being transmitted, and a signature 559 used by the publisher of the content to digitally sign the published content. Signature 559 is one example of a validation algorithm and validation payload, which is used to verify the CCN packet. Data packet 550 may include elements (e.g., optional TLVs 554, name 556, etc.) encoded in a type-length-value (TLV) format, but the packet itself may not be encoded in a TLV format. In some implementations, data packet 550 can also include other elements. It should be noted that CCN interest and data packets could contain additional elements and fields not represented in FIGS. 5A and 5B depending on particular needs and implementations.

FIGS. 6A-6C illustrate various possible formats for names and their name components in interest and data packets of ICN protocols, according to at least some embodiments described herein. In FIG. 6A, a name element 600 illustrates an example type-length-value (TLV) format for encoding a name in a packet. The format illustrated by name element 600 may be used in both CCN and NDN implementations in which flow classification is achieved by one or more equivalence class identifiers (e.g., an equivalence class name component type (ECNCT)) and a name being encoded together in a packet. In at least one embodiment, an ECNCT can be encoded with a name in both data and interest packets.

In an ECNCT flow classification embodiment, name element 600 represents a possible format of encoded names 402, 452, 506, and 556 in NDN interest packet 400, NDN data packet 450, CCN interest packet 500, and CCN data packet 550, respectively. Name element 600 can include a name-type field 602, a name-length field 604, and a name-value field 606. Name-component elements 608-1 through 608-X may be nested within name element 600 in name-value field 606.

In an ECNCT flow classification embodiment, one or more equivalence class identifiers are encoded directly in the name element. The ECNCT value can be set by a producer as part of constructing all data packets in a desired equivalence class. A consumer application may also know the ECNCT value as it may be hard-coded in the consumer application, communicated to the consumer node (e.g., through a manifest file), or advertised via routing announcements, for example. In at least one embodiment, the ECNCT is immutable for the lifetime of the associated named data. Consequently, in addition to data packets, interest packets are also encoded with ECNCT values. If ECNCT values are not encoded in an interest name, then corresponding data packets may not be returned to the consumer node because the name in the data packet may not match the name in the interest packet.

An equivalence class name component explicitly indicates the equivalence class, and implicitly makes all data packets named below it in the hierarchy part of that equivalence class. In other words, a name can have multiple equivalence class identifiers (e.g. flow and object) using this scheme. Depending on where in the name component hierarchy the ECNCT is placed, either finer or coarser granularity can be achieved than what is provided by routable name prefixes, which typically include the minimum number of name components needed to route interests to the producer of the requested data.

The details of how to encode the ECNCT name component may differ among ICN architectures. FIG. 6B illustrates possible details of a name component element 610, with a type-length-value (TLV) format for encoding name components of a name in a CCN implementation. In a CCN network, name component element 610 can represent name component elements 608-1 through 608-X, which can be marked with an ECNCT value. Name component element 610 can include a name-component-type field 612, a name-component-length field 614, and a name-component-value field 616. The CCN design uses explicitly typed name components, so an explicit name component type can be assigned to indicate equivalence class. For example, name-component-type field 612 of a particular name component can contain a specially recognized value to explicitly indicate a flow or object equivalence class defined by that particular name component. Name-component-length field 614 can contain a length of name-component-value field 616. Name-component-value field 616 can contain data representing the name component.

FIG. 6C illustrates possible details of another name component element 620, with a type-length-value (TLV) format for encoding name components of a name in an NDN implementation. In an NDN network, name component element 620 can represent name component elements 608-1 through 608-X, which can be marked with an ECNCT value. Name component element 620 can include a name-component-type field 622, a name-component-length field 624, and a name-component-value field 626.

Typically, NDN designs eschew typed name components and instead use textual naming conventions for name components. Accordingly, all name components in NDN typically have a single type encoded in their respective name-component-type fields. However, the NDN architecture allows for special markers in a value field of a name component element. In at least one embodiment, name-component-value field 626 can contain an equivalence class identifier, such as ECNCT marker 627, to explicitly indicate a flow or object equivalence class defined at that name component. Name-component-value field 626 can also contain name component data 629. In addition, name-component-length field 624 can contain a length of name-component-value field 626.

FIG. 7 is a table illustrating an example name 700 encoded with equivalence class identifiers that could be used in a data or interest packet of an ECNCT flow classification embodiment. In this embodiment, the name encoding is based on typed name components. In FIG. 7, the example name includes the following name components: /com, /youtube, /<mediaID>, /video or /audio, /<frameID>, and /<segment#>. For illustration purposes, assume the name includes a /video (rather than /audio) name component. In example name 700, equivalence class identifiers are encoded directly into three name components, which effectively mark or identify those three name components. Specifically, the /<media> name component is marked as a flow component type 702, the /video name component is marked as a flow component type 704, and the /<frameID> name component is marked as an object component type 706.

In ECNCT flow classification embodiments, when an ICN router receives a packet with a name, it can be processed on a component-by-component basis, and substreams can be identified according to name prefixes indicated by the equivalence class identifiers. The identification of substreams enables special treatment of selected substreams. For example, video substreams can be discriminated from other substreams, such as audio substreams. In the example of FIG. 7, three name components include equivalence class identifiers to define a hierarchy of flows (or substreams). Specifically, two flow components and one object component are encoded to define the following hierarchy of flows:

First level name prefix: /com/youtube/<mediaID>
Second level name prefix: /com/youtube/<mediaID>/video
Third level name prefix: /com/youtube/<mediaID>/video/<frameID>

In a CCN implementation, an equivalence class identifier may be in the form of an explicit name component type. An explicit name component type can be assigned to particular name components to achieve the desired flow classification. For example, in name 700, an explicit name component type can be encoded in a name-component-type field (e.g., name-component-type field 612) of a name component element for /<mediaID> to indicate it is the last name component of the first level name prefix for a first equivalence class. The explicit name component type can also be encoded in the name-component-type field of the name component element for /video to indicate it is the last name component of a second name prefix for a second equivalence class. Similarly, the same or a different explicit name component type can be encoded in the name-component-type field of the name component element for /<frameID> to indicate it is the last name component of a third name prefix for a third equivalence class. The explicit name component types may be the same for each of the name components that define an equivalence class. Alternatively, one or more of the explicit name component types may vary when multiple typed name components are used to define multiple equivalence classes.

In an NDN implementation, an equivalence class identifier may be in the form of an ECNCT marker. An ECNCT marker can be encoded in the name-component-value field (e.g., name-component-value field 626) of a name component element (e.g., name component element 620) to achieve the desired flow classification. For example, in name 700, an ECNCT marker could be encoded in the name-component-value field of the name component element for /<mediaID> to indicate it is the last name component of the first level name prefix for a first equivalence class. An ECNCT marker can be encoded in the name-component-value field of the name component element for /video (or /audio) to indicate it is the last name component of a second name prefix for a second equivalence class. Finally, an ECNCT marker can be encoded in the name-component-value field of the name component element for /<frameID> to indicate it is the last name component of a third name prefix for a third equivalence class. In at least one embodiment one or more constant strings may be chosen as ECNCT markers to be distinguishable from other name component semantics. The ECNCT markers may be the same for each of the name components that define an equivalence class. Alternatively, one or more of the ECNCT markers may vary when multiple name components are used to define multiple equivalence classes.

Figure 8:
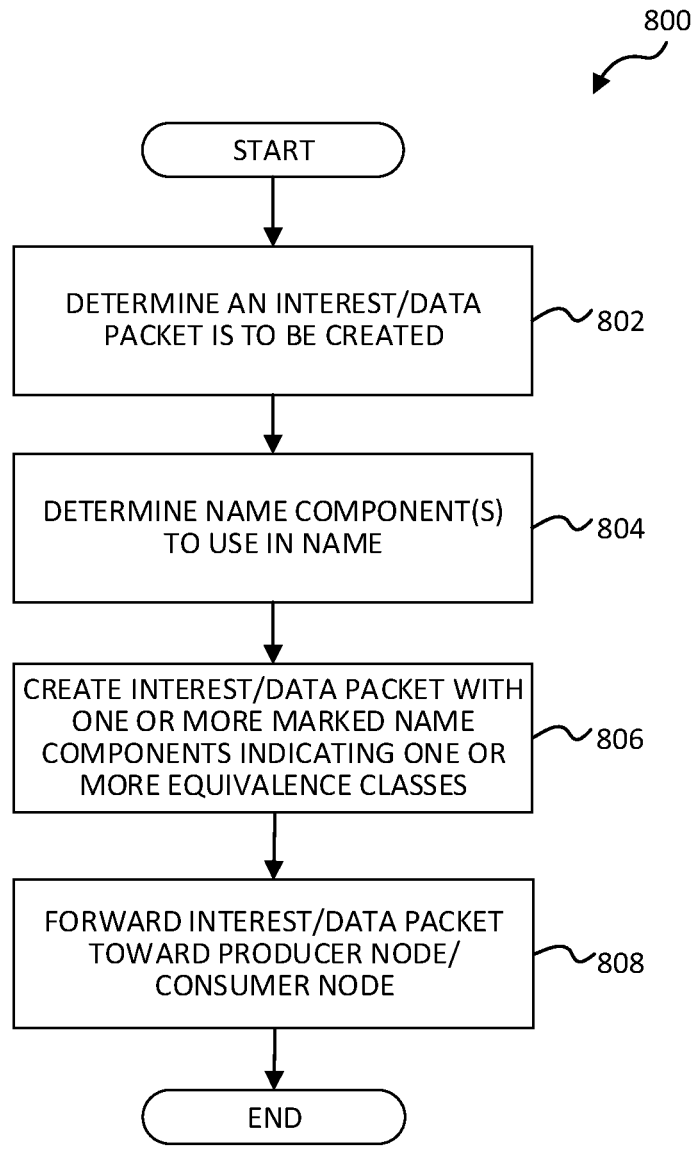
FIG. 8 is a simplified flowchart illustrating example operations associated with flow classification, according to at least one embodiment.

Turning to FIG. 8, FIG. 8 shows a flow 800 of possible operations that may be associated with an ECNCT flow classification embodiment described herein. One or more sets of operations may correspond to activities of FIG. 8. In at least one embodiment, consumer node 120 comprises means such as one or more processors (e.g., processor 127), for performing the operations associated with creating an interest packet. In one example, at least some of the operations may be performed by flow classification module 122 and/or consumer application 124 when executed by one or more processors such as processor 127. It will be apparent that at least in some embodiments, the same or similar operations associated with creating a data packet may be performed in producer node 130. Producer node 130 comprises means, such as one or more processors (e.g., processor 137) for performing such operations. In one example, at least some of the operations may be performed by flow classification module 132 and/or producer application 134 when executed by one or more processors such as processor 137.

Flow 800 will first be described with reference to consumer node 120 creating an interest packet. At 802, a determination is made that an interest packet is to be created. This determination can be made by consumer application 124, for example, upon receiving input from a user to access named data. Other examples include, but are not limited to, the consumer application determining an interest packet is to be created to access data needed by the consumer application or requested by another process.

At 804, the consumer node determines which name components are to be used to create an interest packet. This information could be obtained using any suitable technique. For example, this information could be hard coded in the consumer application, could be supplied by a manifest file, could be accessed on some type of external storage, or could be obtained from advertisements from the producer node. One or more of the name components can include equivalence class identifiers (e.g., ECNCT).

At 806, the interest packet is created with one or more marked name components indicating one or more name prefixes. The one or more name prefixes correspond, respectively, to one or more equivalence classes of the packet. In a CCN network, name components of a name can be in the form of name component elements (e.g., 610). A name-component-type field (e.g., 612) of each name component element corresponding to a marked name component contains an equivalence class identifier (e.g., explicit ECNCT).

In an NDN network, the marked name components can be generated in the form of name component elements (e.g., 620). A portion of a name-component-value field (e.g., 626) of each name component element corresponding to the marked name components is encoded with an equivalence class identifier (e.g., ECNCT marker 627). In one example, an ECNCT marker can be a constant string. At 808, the consumer node can forward the interest packet toward the producer node. At 808, the consumer node can forward the interest packet toward the producer node.

Flow 800 will now be described with reference to producer node 130 creating a data packet in response to receiving an interest packet. At 802, a determination is made that a data packet is to be created. This determination can occur upon receiving a corresponding interest packet. At 804, the producer node determines which name components are to be used to create an interest packet. Typically, name schemas are part of designing and implementing a producer application. Accordingly, this information may be hard-coded or otherwise accessible by the producer application in a predetermined manner. In another scenario, the name for the data packet could be obtained from the corresponding interest packet. One or more of the name components can include equivalence class identifiers (e.g., ECNCT marker).

At 806, the data packet is created with one or more marked name components indicating one or more name prefixes. The one or more name prefixes correspond, respectively, to one or more equivalence classes of the packet. In a CCN network, name components of a name can be in the form of name component elements (e.g., 610). A name-component-type field (e.g., 612) of each name component element corresponding to a marked name component contains an equivalence class identifier (e.g., explicit ECNCT).

In an NDN network, the marked name components can be generated in the form of name component elements (e.g., 620). A portion of a name-component-value field (e.g., 626) of each name component element corresponding to the marked name components is encoded with an equivalence class identifier (e.g., ECNCT marker 627). In one example, an ECNCT marker can be a constant string. The producer node also identifies the content being requested by the received interest packet based on the name in the interest packet. The content may be calculated, generated, retrieved from storage, or otherwise obtained by the producer node, based on the name. The content is also added to the data packet. At 808, the producer node can forward the data packet toward the consumer node.

Figure 9:
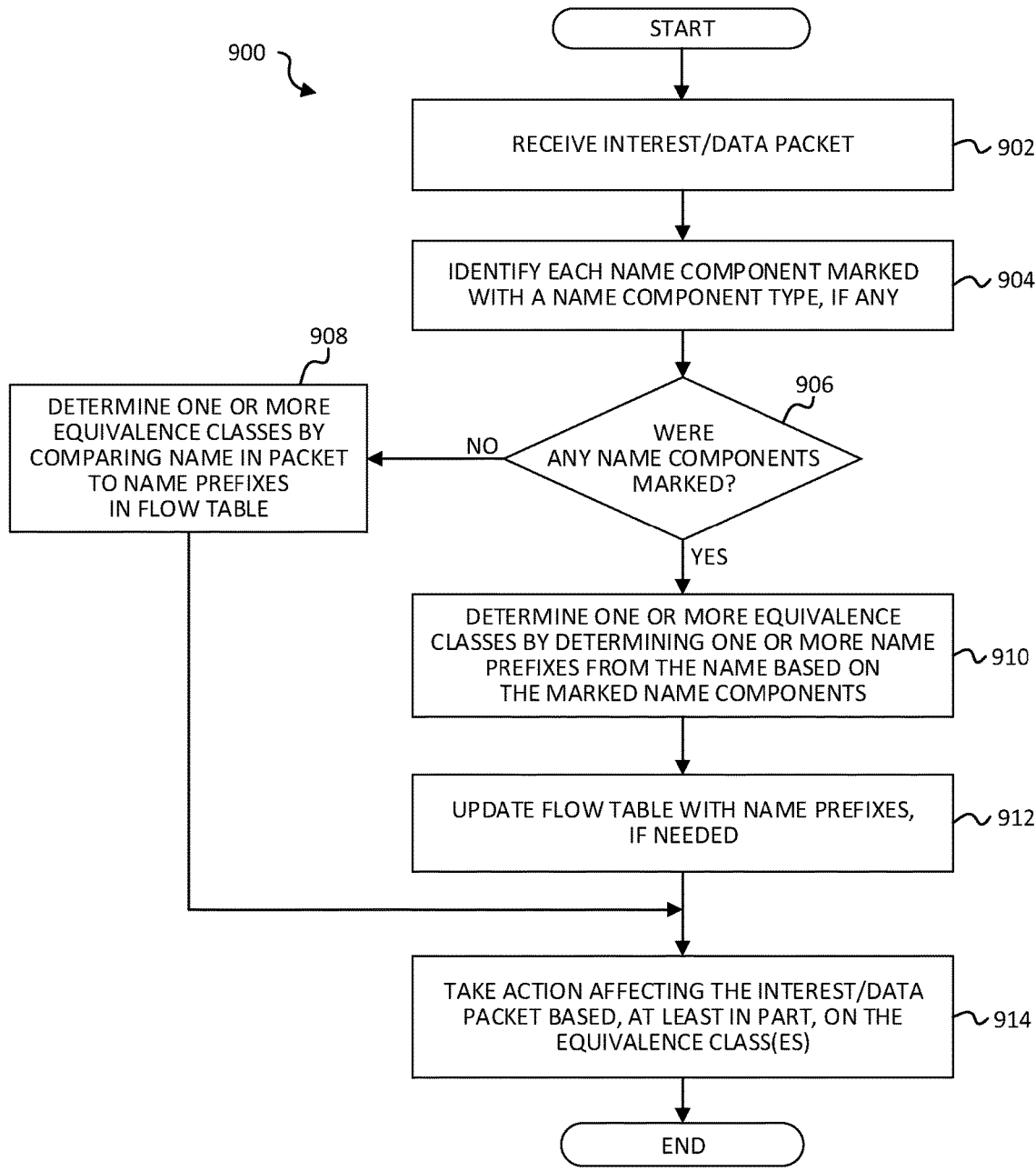
FIG. 9 is a simplified flowchart illustrating further example operations associated with flow classification, according to at least one embodiment.

Turning to FIG. 9, FIG. 9 shows a flow 900 of possible operations that may be associated with an ECNCT flow classification embodiment described herein. One or more sets of operations may correspond to activities of FIG. 9. ICN routers 150(1)-150(N) comprise means, such as one or more processors for performing the operations. ICN node 200 is one example of an ICN router that may perform the operations. In ICN node 200, at least some of the operations may be performed by equivalence class identification logic 201, flow management logic 202, and/or control logic 203 when executed by one or more processors such as processor 207. It will be appreciated that a router configured to operate in conjunction with a CCN or NDN protocol (or other ICN protocol) could also implement flow 900 in accordance with ECNCT flow classification embodiments described herein.

At 902, an ICN router receives an interest or data packet. Examples of packets that may be received include, but are not limited to, NDN interest packet 400, NDN data packet 450, CCN interest packet 500, and CCN data packet 550, depending on the type of ICN architecture in the network. At 904, the ICN router identifies each name component marked with an equivalence class identifier, such as a name component type (or ECNCT), in the packet. In at least one example, the ICN router can process the name in the packet on a component-by-component basis to determine which name components have an equivalence class identifier. In an NDN network, each name component element (e.g., 620) in a name element (e.g., 600) of the packet can be examined to determine if it contains a name component type. In one example, the name component type may be encoded in a portion of a name-component-value field (e.g., 626) of the name component element. In a CCN network, each name component element (e.g., 610) in a name element (e.g., 600) of the packet can be examined to determine whether it has an explicit name component type encoded in a name-component-type field (e.g., 612).

In at least one embodiment, a determination can be made at 906, as to whether any name components are marked with name component types. If no name components are marked, then at 908 one or more equivalence classes may be determined by comparing the name in the packet to name prefixes in a flow table, such as name prefixes 212 in flow table 210. At 914, an action may be taken that affects the packet based, at least in part, on the one or more determined equivalence classes, if any.

If marked name components in the name are identified, as determined in 906, then at 910, for each identified marked name component, the ICN router determines an equivalence class by determining a respective name prefix of the name. A name prefix can be determined by identifying a group of name components in the name based on a particular marked name component. The group of name components can include all of the name components in a sequence from the beginning name component up to and including the particular marked name component, which is the last name component in the name prefix. In an NDN network, a different group of name components can be identified based on each name component element that includes a name component type encoded in a value field of the name component element. In a CCN network, a different group of name components can be identified based on each name component element that includes an explicit name component type encoded in a type field of the name component element. Thus, multiple equivalence classes may be determined for a hierarchy of flows. For example, the different groups of name components identified in name 700 of FIG. 7 (assuming it is a video flow), include the following based on the marked name components (e.g., flow and object markers) in the name:

/com/youtube/<mediaID>
/com/youtube/<mediaID>/video
/com/youtube/<mediaID>/video/<frameID>

At 912, flow table 201 of ICN node 200 may be updated with name prefixes determined from the name in the packet, if needed. For example, if a particular name prefix determined from the name at 912 is not present in flow table 210, then the name prefix may be added to flow table 210. In some embodiments, name prefixes can be mapped to equivalence class identifiers (e.g., name component types) in the flow table. In some embodiments, however, if the name component elements are encoded with name component types, the name prefixes in flow table may not be mapped to equivalence class identifiers such as name component types.

At 914, one or more actions that affect the packet may be taken. Generally, actions may be taken on packets (or flows) that are determined to be part of the same one or more equivalence classes. For example, in the example of FIG. 7, all interest packets being routed to /com/youtube/<mediaID> may receive the same treatment, all video packets being routed to /com/youtube/<mediaID>/video may receive the same treatment, and all video packets having the same frameID that are being routed to /com/youtube/<mediaID>/video/<frameID> may receive the same treatment. Specific examples of actions that may be performed include, but are not limited to, dropping a packet, using a particular interface for a packet, security related actions, quality of service (QoS) related actions, and/or traffic engineering.

It should be noted that the particular logic described with reference to FIG. 9 could be modified or changed considerably in accordance with the broad concepts described in this application. By way of example, in one embodiment when an ICN node receives an interest or data packet, the name in the packet may be compared to name prefixes in the flow table to attempt to determine equivalence classes of the packet before identifying name components marked with equivalence class identifiers in the name of the packet. In some embodiments, if no equivalence classes are determined based on the flow table, then the name in the packet may be analyzed to determine equivalence classes based on equivalence class identifiers that mark particular name components in the packet. This is just one possible alternative in the logic implemented to determine equivalence classes of interest and data packets using ECNCT, and it should be appreciated that any number of variations may be possible within the broad scope of this disclosure.

Figure 10:
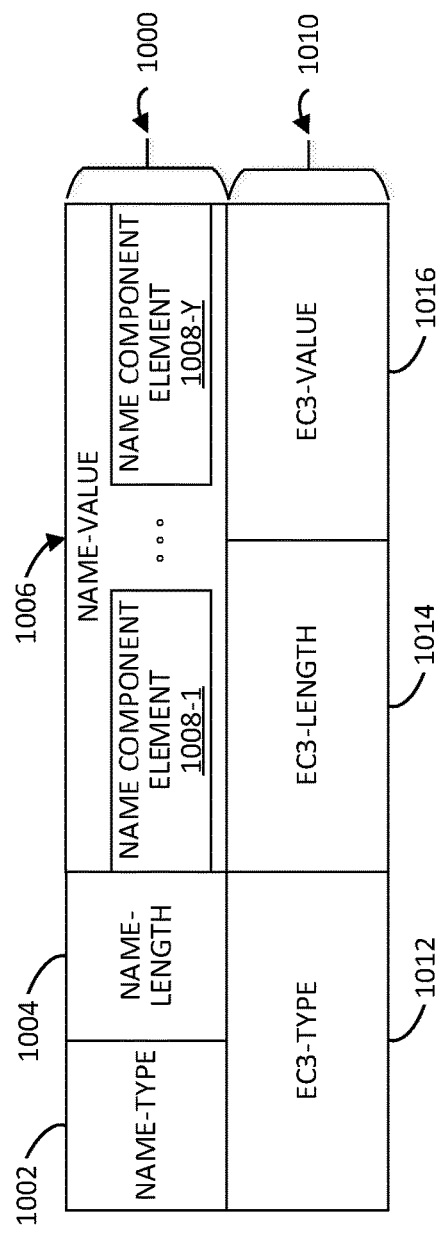
FIG. 10 illustrate a possible format for a name with name components and an equivalence class component count in interest and data packets in the ICN environment in which flow classification is implemented, according to at least one embodiment.

FIG. 10 illustrates a possible format for names and their equivalence class component counts in data packets of ICN protocols, according to embodiments in which flow classification is enabled by an equivalence class component count (EC3). In an EC3 flow classification embodiment, a name in a data packet can be encoded in a type-length-value (TLV) format as indicated by name element 1000. Name element 1000 represents possible implementations of names 452 and 552 in NDN data packet 450 and CCN data packet 550, respectively. Name element 1000 includes a name-type field 1002, a name-length field 1004, and a name-value field 1006. Name components of the name can be encoded in a type-length-value (TLV) format as indicated by name component elements 1008-1 through 1008-Y, which may be nested in name-value field 1006.

In an EC3 flow classification embodiment, a new value can also be encoded in data packets. The new value can be a positive integer referred to herein as an equivalence class component count (EC3) or 'count'. The count indicates a number of name components in a corresponding name that are to be considered as one equivalence class instance, when grouped together in a sequence as a name prefix. In at least one embodiment, the group of name components to be considered an equivalence class instance can be identified by sequentially counting a number of name components in the name based on the count. The counting may begin at a first name component of the name and may not exceed the count. In at least one embodiment, a first name component in the identified group of name components corresponds to a first name component in the name. Although the number of name components in the group can be any positive integer that is not greater than a total number of name components in the name, generally, the number is greater than the number of name components in a routable name prefix of the name and less than the total number of name components in the name.

In FIG. 10, an EC3 element 1010 illustrates a type-length-value (TLV) format for encoding an EC3 in a packet. EC3 element 1010 includes an EC3-type field 1012, an EC3-length field 1014, and an EC3-value field 1016. In at least one embodiment, EC3 element 1010 is a separate element in the packet from name element 1000. EC3 element 1010, in conjunction with name element 1000, can enable flow classification in ICN networks including, but not limited to, CCN and NDN implementations. Additionally, in some embodiments, an interest packet with a name element may also carry an EC3 element associated with the name, as depicted in FIG. 10.

A security envelope may be used in ICN protocols to provide cryptographic message integrity to the name and content in a data packet. Embodiments may vary on whether an EC3 element is inside or outside the security envelope. In at least one embodiment, EC3 element 1010 is outside the security envelope. If the EC3 element is outside the security envelope, routers in the ICN network can be allowed to modify the EC3 element. Thus, aggregation/disaggregation of flows could be performed by the routers as well as the consumer nodes.

In other embodiments, the EC3 element may be inside the security envelope. With the EC3 element inside the security envelope, certain attack scenarios against flow classification for quality of service or firewall filtering may be prevented. When the EC3 element is inside the security envelope, the ICN router can read, but not change, the count. This is because the count is covered by a security signature. In at least one embodiment, a key is used to sign at least the name element and the EC3 element to create the security envelope. In at least one embodiment, the key can be provided by a content publisher or content producer. The name and count are not encrypted so that ICN routers can read the name and count and process the packet accordingly. The content element and meta-info element of the data packet may also be signed and secured within the security envelope.

EC3 element 1010 can be provided at a particular location in a data packet based on particular implementations and needs. For example, if the EC3 is to be secured inside the security envelope, then EC3 element 1010 could be placed after name element 1000, as shown in FIG. 10, or after the content field (e.g., content 454, content 558) of the data packet. It can be beneficial for the EC3 element to be placed adjacent to other fields of the packet that are protected by the security envelope because the signing operation is able to work with a contiguous piece of memory.

If the EC3 is to be outside of the security envelope, however, then the EC3 element can precede the name element and other fields covered by the security envelope. For example, in a CCN data packet, the EC3 element could be placed in optional TLV elements (e.g., optional TLVs 554), which are also known as 'hop-by-hop' packet headers. In another example, the EC3 element could be placed in packet headers of the link layer, which is one level below the ICN layer.

The equivalence class component count can be any positive integer that does not exceed the total number of name components in a name. Generally, the count is likely to exceed the length of the routable prefix of a name. In some instances, however, the count may be shorter than (or the same as) a routable prefix of a name. For example, a network administrator may desire to mark multiple services with the same equivalence class. Greater or lesser granularity can be achieved based on the count. For example, instead of treating all packets from a news producer in the same manner, the count can indicate equivalence classes to discriminate the news producer's video flows from their audio flows.

An embodiment with a separate EC3 element provides advantages in classifying flows. When the EC3 element is in a separate portion of the packet from the name element, producer nodes can 'regroup' equivalence classes dynamically by including more or fewer levels of the name hierarchy when the producer nodes respond to interests for the corresponding data packets. This separate portion may include three fields for TLV formatting (e.g., type, length, and value). This feature provides flexibility in re-grouping equivalence classes and aggregating flows at different granularities.

Figure 11:
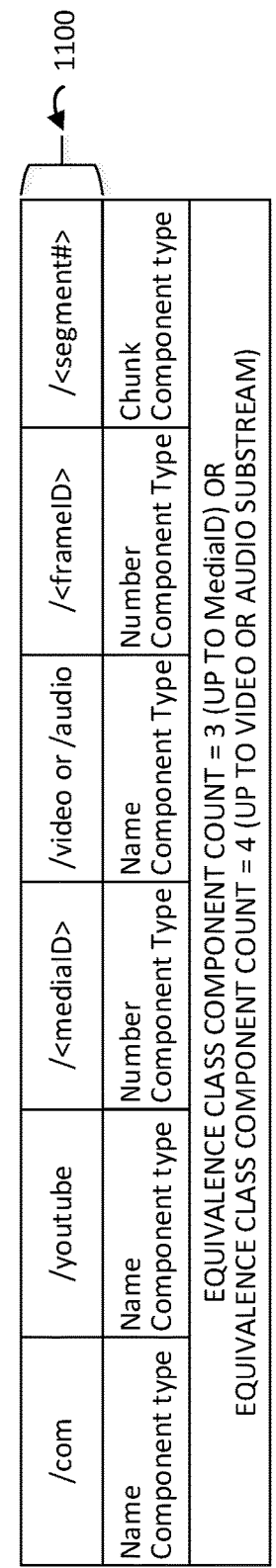
FIG. 11 is table showing an example name and possible equivalence class component counts, according to at least one embodiment.

FIG. 11 is a table illustrating an example name 1100 that can be encoded in an interest and data packet in an EC3 flow classification embodiment. In FIG. 11, the example name includes the following name components: /com, /youtube, /<mediaID>, /video or /audio, /<frameID>, and /<segment#>. For illustration purposes, assume the name includes a /video (rather than an /audio) name component. An equivalence class identifier, such as an equivalence class component count, can be encoded directly into an EC3 element of the data packet.

If EC3=3, then name components of the name can be grouped together up to the third name component, /<mediaID>, to define the following name prefix: /com/youtube/<mediaID>. If EC3=4, then name components of the name can be grouped together up to the fourth name component, /video or /audio, to define one of the following name prefixes: /com/youtube/<mediaID>/video or /com/youtube/<mediaID>/audio, depending on whether the data packet is a video or audio packet. A substream can be identified according to a name prefix indicated by an equivalence class identifier, which enables special treatment of the identified substream. For example, video substreams can be discriminated from other substreams, such as audio.

Figure 12:
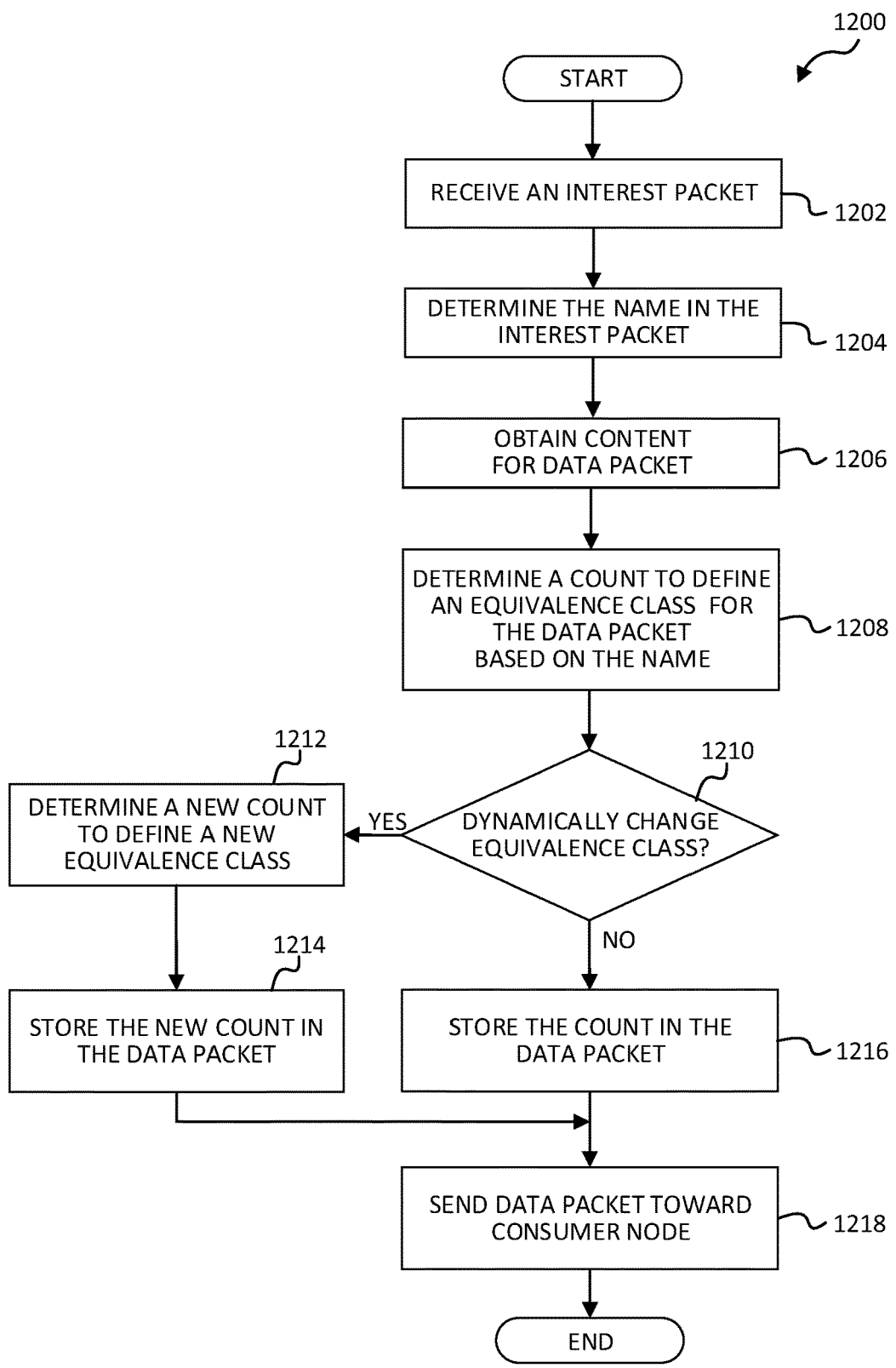
FIG. 12 is a simplified flowchart illustrating example operations associated with flow classification, according to at least one embodiment.

Turning to FIG. 12, FIG. 12 shows a flow 1200 of possible operations that may be associated with an equivalence class component count (EC3) embodiment described herein. One or more sets of operations may correspond to activities of FIG. 12. In at least one embodiment, producer node 130 comprises means such as one or more processors (e.g., processor 137), for performing the operations. In one example, at least some of the operations may be performed by flow classification module 132 and/or producer application 134 when executed by one or more processors such as processor 137 when creating a data packet to respond to an interest packet.

At 1202, the producer node receives an interest packet with a name that corresponds to data being requested. Upon receiving the interest packet, at 1204, the name in the interest packet is determined. At 1206, the producer node obtains the content that corresponds to the name. The content may be calculated, generated, retrieved from storage, or otherwise obtained by the producer node, based on the name.

At 1208, the producer node determines an equivalence class identifier, such as an equivalence class component count, to be used to define an equivalence class for the data packet. The count indicates a number of name components in the name, when grouped together in a sequence as a name prefix, are to be considered an equivalence class instance. In at least one embodiment, this information can be set based on the producer application. Typically, name schemas are part of designing and implementing a producer application. Accordingly, the name of the data packet and the desired count may be hardcoded or otherwise accessible by the producer application in a predetermined manner. In another scenario, the name for the data packet could be obtained from the corresponding interest packet if the embodiment enables equivalence class component counts to be encoded in interest packets as well as data packets.

At 1210, a determination can be made as to whether the equivalence class should be dynamically changed. Specifically, a determination is made as to whether the determined count for the named data should be changed to a higher or lower value, thereby changing the equivalence class to be indicated by the data packet. This determination can be made, for example, based on policies, input from a user (e.g., network operator), or the interest packet.

If it is determined that the equivalence class should be dynamically changed, then at 1212, the producer node can determine a new count to be used to define a new equivalence class. At 1214, the new count can be stored in the data packet. For example, the new count can be encoded in an EC3 element (e.g., 1010) in the data packet. If it is determined that the equivalence class should not be dynamically changed, then at 1216, the originally determined count can be encoded in the EC3 element in the data packet. At 1218, once the data packet is completed, the data packet can be forwarded in the direction of the consumer node. In at least one embodiment, the data packet can be forwarded along the reverse path taken by the corresponding interest packet.

Figure 13:
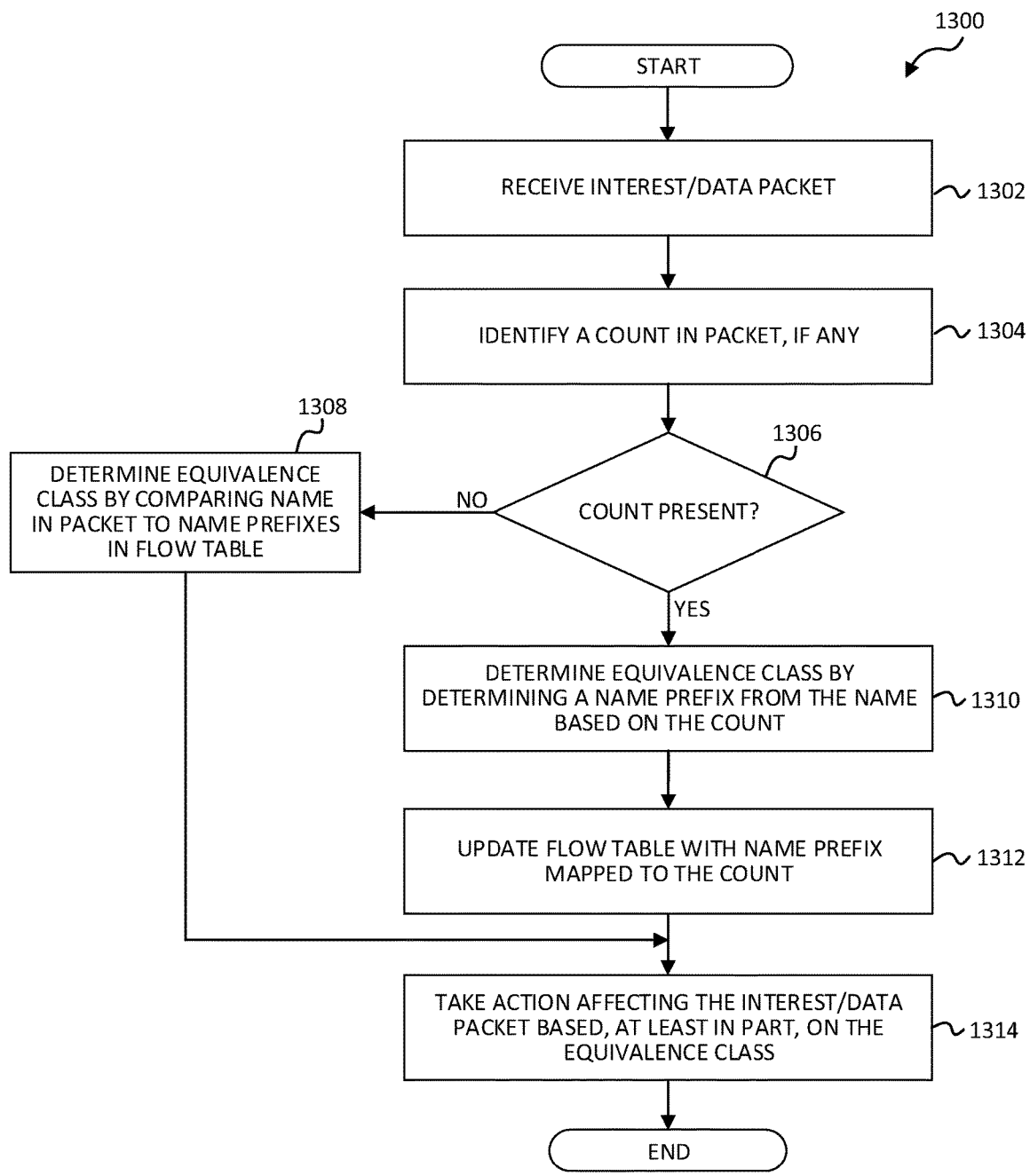
FIG. 13 is a simplified flowchart illustrating further example operations associated with flow classification, according to at least one embodiment.

Turning to FIG. 13, FIG. 13 shows a flow 1300 of possible operations that may be associated with an EC3 flow classification embodiment described herein. One or more sets of operations may correspond to activities of FIG. 13. ICN routers 150(1)-150(N) comprise means, such as one or more processors for performing the operations. ICN node 200 is one example of an ICN router that may perform the operations. In ICN node 200, at least some of the operations may be performed by equivalence class identification logic 201, flow management logic 202, and/or control logic 203 when executed by one or more processors such as processor 207. It will be appreciated that a router configured to operate in conjunction with a CCN or NDN protocol (or other ICN protocol) could also implement flow 1300 in accordance with flow classification embodiments described herein.

At 1302, an ICN router receives a data packet. Examples of data packets that may be received include, but are not limited to, NDN data packet 450 or CCN data packet 550, depending on the type of ICN network that is implemented. At 1304, the ICN router identifies an equivalence class identifier in the packet, if any. The equivalence class identifier can be count (or EC3). The count can be a positive integer that is not greater than the total amount of name components in the data packet. The t count may be stored in an EC3 element (e.g., 1010) of the data packet, as previously described herein.

In at least one embodiment, a determination can be made at 1306, as to whether a count is present in the packet. If a count is not present, or if a count is present and is equal to zero, then at 1308, one or more equivalence classes may be determined by comparing the name in the packet to name prefixes in a flow table, such as name prefixes 212 in flow table 210. At 1316, an action may be taken that affects the packet based, at least in part, on the determined equivalence class, if any.

If a count is identified in the packet, as determined at 1306, then at 1310, the ICN router determines an equivalence class by determining a name prefix of the name based on the count. A name prefix includes a group of name components from the name. The group of name components can be identified by sequentially counting a number of name components in the name based on the count. Thus, in at least one embodiment, the number of name components in the group equals the count. Additionally, a first name component in the group can correspond to a first name component in the name. For example, assume the data packet is encoded with name 1100 of FIG. 11. If the value of the count is 4, then the ICN router considers the first four name components in the name as one flow. In this case, the group of name components that define the name prefix is /com/youtube/<mediaID>/video or /com/youtube/<mediaID>/audio, depending on whether the content in the data packet is video or audio, respectively. In another example, if the value of the count is 3, then the ICN router considers the first three name components in the name as one flow. In this case, the group of name components that define the name prefix is /com/youtube/<mediaID>.

At 1312, flow table 201 of ICN node 200 may be updated with a name prefix determined from the name in the packet, if needed. For example, if the name prefix determined from the name at 1312 is not present in flow table 210, then the name prefix may be added to flow table 210. In at least some embodiments, the name prefix can be mapped to its corresponding equivalence class identifier (e.g., count) in the flow table.

At 1314, an action may be taken that affects the packet (or flow) based on the associated equivalence class. Generally, similar actions may be taken on other packets (or flows) that are determined to be part of the same equivalence class. For example, all packets being routed to /com/youtube/<mediaID> may receive the same treatment, all video packets being routed to /com/youtube/<mediaID>/video may receive the same treatment, and all video packets having the same frameID that are being routed to /com/youtube/<mediaID>/video/<frameID> may receive the same treatment. Specific examples of actions that may be similar or the same as those described with reference to 914 of FIG. 9.

It should be noted that the particular logic described with reference to FIG. 13 could be modified or changed considerably in accordance with the broad concepts described in this application. By way of example, in one embodiment when an ICN node receives an interest or data packet, the name in the packet may be compared to name prefixes in the flow table to attempt to determine equivalence classes of the packet before identifying a count in the packet. In some embodiments, if no equivalence classes are determined based on the flow table, then the name in the packet may be analyzed to determine whether it carries a count (EC3) in the packet. This is just one possible alternative of logic implemented to determine equivalence classes of interest and data packets using equivalence class component counts, and it should be appreciated that any number of variations may be possible within the broad scope of this disclosure.

Variations and Implementations

In certain example implementations, flow classification embodiments described herein may be implemented in ICN network 110 by logic encoded in one or more tangible media (e.g., embedded logic provided in an application specific integrated circuit (ASIC), digital signal processor (DSP) instructions, software (potentially inclusive of object code and source code) to be executed by one or more processors or other similar machine, instructions in software, hardware, firmware, or any combination thereof, etc.). This tangible media may be non-transitory in at least one embodiment. In some of these instances, one or more memory elements can store data used for the operations described herein. This includes the memory elements (e.g., memory elements 129, 139, 209) being able to store software, logic, code, and/or processor instructions that are executed to carry out the activities described herein. A processor can execute any type of instructions associated with the data to achieve the operations detailed herein. In one example, a processor in the flow communication embodiments (e.g., processors 127, 137, 207) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements) can include memory for storing information to be used in achieving the flow classification capabilities in an ICN network, as outlined herein. Additionally, these network elements may include at least one processor that can execute software, an algorithm, or other instructions to perform the flow classification capabilities, as disclosed herein. These network elements may further keep information, to be used in achieving the flow classification capabilities as discussed herein, in any suitable memory element (ternary content-addressable memory (TCAM), random access memory (RAM), read only memory (ROM), EPROM, EEPROM, ASIC, etc.), software, hardware, or in any other suitable component, device, element, or object where appropriate and based on particular needs. Any of the memory items discussed herein (e.g., caches, repositories, stores, databases, tables, buffers, etc.) should be construed as being encompassed within the broad term 'memory element.' Similarly, any of the potential processing elements, modules, and machines described herein should be construed as being encompassed within the broad term 'processor.' Each of the network elements can also include suitable interfaces for receiving, sending, and/or otherwise communicating data or information in an ICN network environment.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that the systems described herein are readily scalable and can accommodate a large number of components, as well as more complicated/sophisticated arrangements and configurations. Accordingly, the examples provided should not limit the scope or inhibit the broad teachings of the flow classification embodiments in ICN environment 100 as potentially applied to a myriad of other architectures or implementations. For example, while reference has been made to Named Data Networking and Content Centric Networking, the flow classification embodiments may be implemented in other variations of ICN networks.

It is also important to note that the activities, interactions, and operations shown and described herein illustrate only some of the possible scenarios and patterns that may be executed by, or within, the flow classification embodiments. Some of these activities, interactions, and/or operations may be deleted, moved, or removed where appropriate, or may be modified or changed considerably without departing from the scope of the present disclosure. In addition, a number of these activities, interactions, and/or operations have been described as being executed in a particular order or concurrently with, or in parallel to, one or more additional activities, interactions, and/or operations. However, the timing of these activities, interactions, and/or operations may be altered considerably.

The preceding operational flows have been offered for purposes of example and discussion. Substantial flexibility is provided by the flow classification capabilities of ICN environment 100 in that any suitable arrangements, chronologies, configurations, and timing mechanisms may be provided without departing from the teachings of the present disclosure. Additionally, these activities can be facilitated by various modules and/or components which can be suitably combined in any appropriate manner, or partitioned or otherwise divided in any appropriate manner, and which may be based on particular configuration and/or provisioning needs.

As used herein, unless expressly stated to the contrary, use of the phrase 'at least one of' preceding multiple items (e.g., elements, conditions, activities, etc.) is intended to mean any combination of the named items. For example, 'at least one of X, Y, and Z' is intended to mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular items (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements that are not necessarily limited by any order, rank, importance, temporal sequence, or hierarchy of the two elements.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although embodiments herein have been illustrated with reference to particular elements and protocols, these elements and protocols may be replaced by any suitable architecture, protocols, and/or processes that achieve the intended functionality of the flow classification in an ICN network as disclosed herein.

What is claimed is:

1. A method, comprising:
   identifying an equivalence class identifier in a packet received by a node configured to perform information centric networking (ICN) in an ICN network, wherein the packet includes a name identifying content associated with a producer node in the ICN network, wherein the equivalence class identifier identifies a name prefix of the name;
   determining an equivalence class for the packet by determining the name prefix based, at least in part, on the equivalence class identifier, wherein the determining the name prefix includes identifying, in a plurality of name components of the name, (i) a name component, and (ii) a group of name components based on the identified name component, which is a last name component in the group, and wherein the equivalence class identifier and the identified name component are stored in a first portion and a second portion of a value field of a name component element in the packet, respectively; and
   taking an action affecting a particular packet, the action based, at least in part, on the equivalence class.

2. The method of claim 1, wherein the packet is one of an interest packet or a data packet.

3. The method of claim 1, wherein the particular packet is one of an interest packet or a data packet.

4. The method of claim 1, wherein the equivalence class identifier is a count indicating a number of name components in the name to be grouped together to determine the name prefix.

5. The method of claim 4, wherein the number is greater than a particular number of name components in a routable name prefix of the name.

6. The method of claim 4, wherein the group of name components are identified by sequentially counting the number of name components in the name, wherein a beginning name component in the group of name components corresponds to a beginning name component in the name.

7. The method of claim 4, wherein a count element in the packet includes a type field, a length field, and a value field, wherein the count is stored in the value field of the count element.

8. The method of claim 1, wherein the first portion is different the second portion.

9. The method of claim 1, further comprising:
   prior to the producer node creating the packet, determining a prior count is to be replaced by the count if a determination is made to dynamically change the equivalence class of the packet; and
   storing the count in the packet.

10. The method of claim 1, wherein a name component element is one of a plurality of name component elements stored in a value field of a name element in the packet.

11. The method of claim 1, wherein the equivalence class identifier is a constant string encoded in the second portion of the value field.

12. The method of claim 1, further comprising:
    identifying one or more other equivalence class identifiers in the packet; and
    determining one or more other equivalence classes for the packet by determining one or more other name prefixes of the name based, at least in part, on the one or more other equivalence class identifiers.

13. At least one machine readable storage medium comprising code that, when executed by at least one processor, causes the at least one processor to:
    identify an equivalence class identifier in a packet received by a node configured to perform information centric networking (ICN) in an ICN network, wherein the packet includes a name identifying content associated with a producer node in the ICN network, wherein the equivalence class identifier identifies a name prefix of the name;
    determine an equivalence class for the packet by determining the name prefix based, at least in part, on the equivalence class identifier, wherein the at least one processor is configured to determine the name prefix by identifying, in a plurality of name components of the name, (i) a name component, and (ii) a group of name components based on the identified name component, which is a last name component in the group, and wherein the equivalence class identifier and the identified name component are stored in a first portion and a second portion of a value field of a name component element in the packet, respectively; and
    take an action affecting an interest packet, the action based, at least in part, on the equivalence class.

14. The at least one machine readable storage medium of claim 13, wherein the equivalence class identifier is a count indicating a number of name components in the name to be grouped together to determine the name prefix.

15. The at least one machine readable storage medium of claim 14, wherein the group of name components are identified by sequentially counting the number of name components in the name, wherein a beginning name component in the group of name components corresponds to a beginning name component in the name.

16. The at least one machine readable storage medium of claim 14, wherein a count element in the packet includes a type field, a length field, and a value field, wherein the count is stored in the value field of the count element.

17. The at least one machine readable storage medium of claim 13, wherein the first portion is different from the second portion.

18. The at least one machine readable storage medium of claim 13, wherein the equivalence class identifier is a constant string encoded in the second portion of the value field.

19. The at least one machine readable storage medium of claim 13, wherein a count element in the packet includes a type field, a length field, and a value field, wherein the count is stored in the value field of the count element.

20. An apparatus, comprising:
one or more network interfaces to send and receive packets in an information centric networking (ICN) network; and
one or more processors coupled to the one or more network interfaces, wherein the one or more processors are configured to:
identify an equivalence class identifier in a packet including a name, the name identifying content associated with a producer node in the ICN network, wherein the equivalence class identifier identifies a name prefix of the name;
determine an equivalence class for the packet by determining the name prefix based, at least in part, on the equivalence class identifier, wherein the one or more processors are configured to determine the name prefix by identifying, in a plurality of name components of the name, (i) a name component, and (ii) a group of name components based on the identified name component, which is a last name component in the group, and wherein the equivalence class identifier and the identified name component are stored in a first portion and a second portion of a value field of a name component element in the packet, respectively; and
take an action affecting an interest packet, the action based, at least in part, on the equivalence class.

21. The apparatus of claim 20, wherein the equivalence class identifier is a count indicating a number of name components in the name to be grouped together to determine the name prefix.

22. The apparatus of claim 21, wherein the group of name components are identified by sequentially counting the number of name components in the name, the counting to start at a beginning name component of the name.

23. The apparatus of claim 20, wherein the equivalence class identifier is a constant string encoded in the second portion of the value field.

* * * * *